(12) United States Patent
Higashino

(10) Patent No.: US 7,074,517 B2
(45) Date of Patent: Jul. 11, 2006

(54) BATTERY MODULE

(75) Inventor: Tatsuya Higashino, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 422 days.

(21) Appl. No.: 10/608,132

(22) Filed: Jun. 30, 2003

(65) Prior Publication Data

US 2004/0021442 A1    Feb. 5, 2004

(30) Foreign Application Priority Data

Jul. 30, 2002    (JP)    ............................. 2002-222116

(51) Int. Cl.
*H01M 2/02* (2006.01)
*H01M 6/42* (2006.01)

(52) U.S. Cl. .................. 429/66; 429/156; 429/157

(58) Field of Classification Search .................. 429/37, 429/66, 120, 156, 157, 159
See application file for complete search history.

(56) References Cited

U.S. PATENT DOCUMENTS

| | | | |
|---|---|---|---|
| 5,098,800 A * | 3/1992 | Plichta et al. ............. | 429/66 X |
| 5,419,981 A * | 5/1995 | Golben ...................... | 429/37 |
| 6,569,561 B1 * | 5/2003 | Kimura et al. ............. | 429/159 |
| 6,709,783 B1 * | 3/2004 | Ogata et al. ............... | 429/120 |
| 6,821,671 B1 * | 11/2004 | Hinton et al. ............... | 429/120 |
| 2003/0017384 A1 * | 1/2003 | Marukawa et al. ......... | 429/120 |

FOREIGN PATENT DOCUMENTS

| | | |
|---|---|---|
| JP | 7-122252 A | 5/1995 |
| JP | 8-321329 A | 12/1996 |
| JP | 9-50821 A | 2/1997 |
| JP | 2000-195480 A | 7/2000 |
| JP | 2001-236937 A | 8/2001 |
| JP | 2003-203615 A | 7/2003 |
| JP | 2003-257391 A | 9/2003 |

OTHER PUBLICATIONS

U.S. Appl. No. 10/603,782, filed Jun. 26, 2003, Oogami.
U.S. Appl. No. 10/608,134, filed Jun. 30, 2003, Oogami.
U.S. Appl. No. 10/608,133, filed Jun. 30, 2003, Oogami.

* cited by examiner

*Primary Examiner*—Stephen J. Kalafut
(74) *Attorney, Agent, or Firm*—Foley & Lardner LLP

(57) ABSTRACT

A plurality of cell units 10a made of stacked cells 10 are stacked. Pressing mechanisms 30 and 31, which apply a pressing force between a pair of pressuring members 20 arranged in a stack direction where the cell units 10a are stacked, are provided, and the cell units 10a are pressured in the stack direction. A state in which the cell units 10a are pressed by the pressing mechanisms 30 and 31 is managed by a managing member 32. Thus, a state where electrode plates of power generation elements 11 are pressed is maintained, and the pressed state of the power generation elements 11 can be precisely managed by the managing member 32.

14 Claims, 13 Drawing Sheets

FIG.1
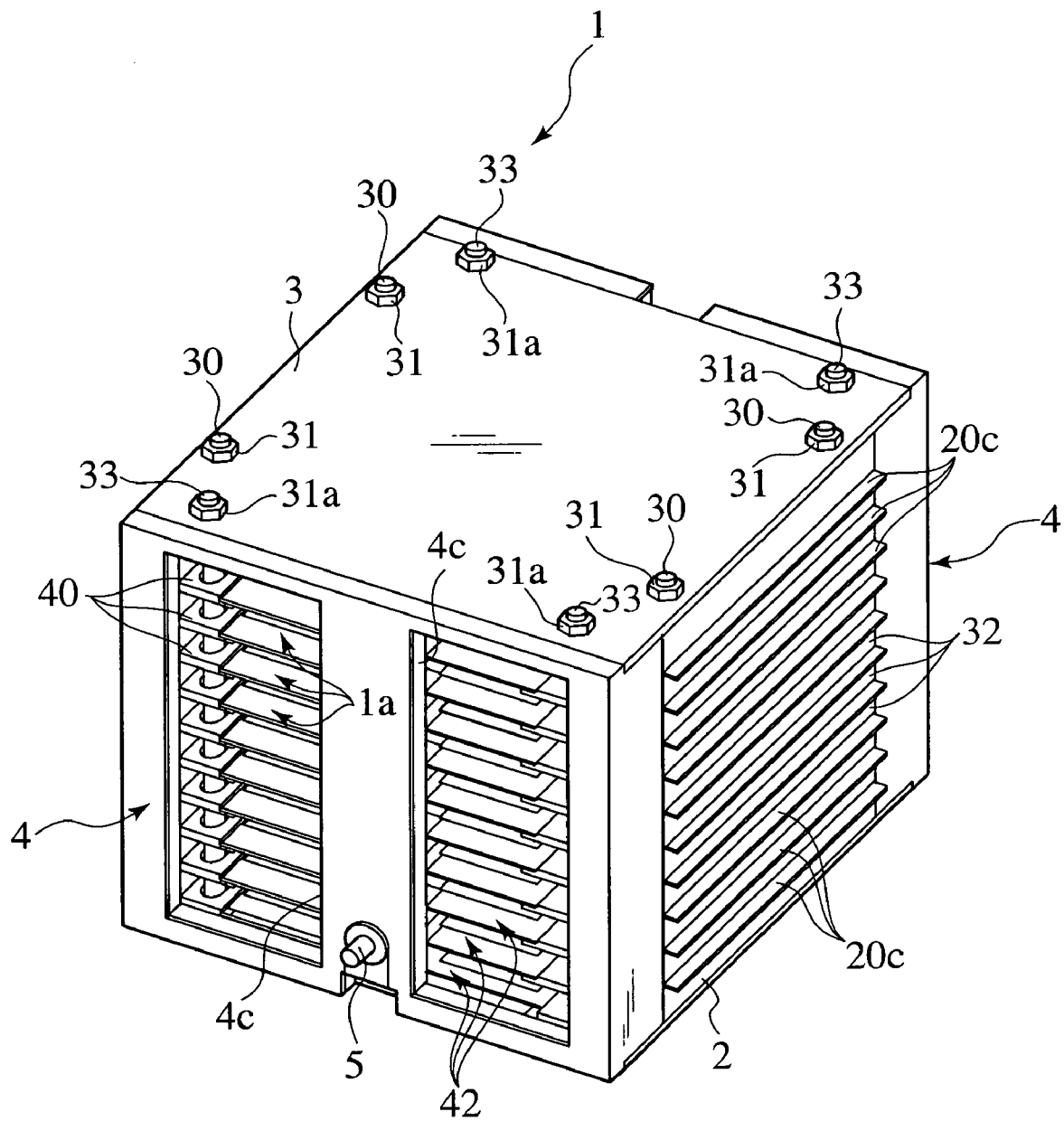
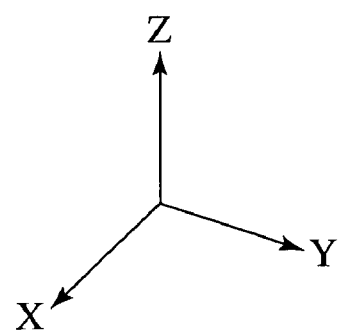

BATTERY MODULE

BACKGROUND OF THE INVENTION

1. Field of the Invention

The present invention relates to a battery module composed by stacking a plurality of stacked cells packaged in a metal composite film.

2. Description of the Related Art

In recent years, electric vehicles which use electricity as a power source and hybrid cars which run by a combination of an engine and a motor have attracted attention under the environment where air pollution due to exhaust gas from automobiles has been a global problem. In this connection, development of a high-power battery to be mounted on these types of vehicles, which achieves high energy/power densities, has occupied an important position in the industry.

For this type of high-power battery, for example, there is a lithium ion battery. As the lithium ion battery, a stacked cell has been known. In the stacked cell, planar positive and negative electrode plates are stacked with one another by interposing separators therebetween (refer to Japanese Patent Laid-Open Publication No. 9-50821 (published in 1997)).

In this stacked cell, both surfaces of a power generation element formed flat and rectangular are sandwiched by a pair of laminate sheets which are formed as polymer-metal composite films, and peripheral portions of the laminate sheets are joined by fusion, thus hermetically sealing an electrolyte solution as well as the power generation element. The plurality of single stacked cells thus configured or a plurality of cell units into which the plurality of stacked cells thus formed are coupled together are stacked, and thus a battery module can be configured to be provided as a high-power battery.

SUMMARY OF THE INVENTION

However, as described above, in this type of stacked cell, the power generation element constructed by stacking the positive electrode plates, the negative electrode plates and the separators are packaged in the flexible laminate sheets. Therefore, when a gap occurs between the positive and negative electrode plates due to an elongation of the laminate sheets and a swell of the stacked electrodes with age, there is a possibility that charge/discharge reactions conducted between the positive and negative electrodes may be lowered. This would possibly cause a problem in deterioration of battery performance.

In this connection, the present invention has been created in consideration of the conventional problems as described above. It is an object of the present invention to provide a battery module designed to enhance deterioration control of the battery performance by managing a surface pressure with high precision while controlling an occurrence of a gap between electrode plates by applying a surface pressure to a power generation element of a stacked cell from an outside of a package material the applied surface pressure.

In order to attain the object, the battery module of the present invention is configured in a manner that a plurality of cell units made of stacked cells are stacked, in each of which an electrolyte solution as well as a power generation element formed by stacking electrode plates are hermetically sealed with a metal composite film as a package material, and that electrode terminals connected individually to the electrode plates of the power generation element are drawn outward from the package material. In the battery module, a pair of pressuring members are arranged in a stack direction of the respective stacked cell units. A pressing mechanism for applying a pressing force between the pair of pressuring members is provided to pressure the cell units in the stack direction, and a state in which the cell units are pressed by the pressing means is managed by a managing member.

BRIEF DESCRIPTION OF THE DRAWINGS

FIG. 1 is a perspective view of an entire battery module in an embodiment of the present invention.

FIG. 12A schematically illustrates a connected state; and FIG. 12B schematically illustrates an unconnected state.

DETAILED DESCRIPTION OF THE PREFERRED EMBODIMENT

The present invention is detailed below based on the drawings.

Figure 2:
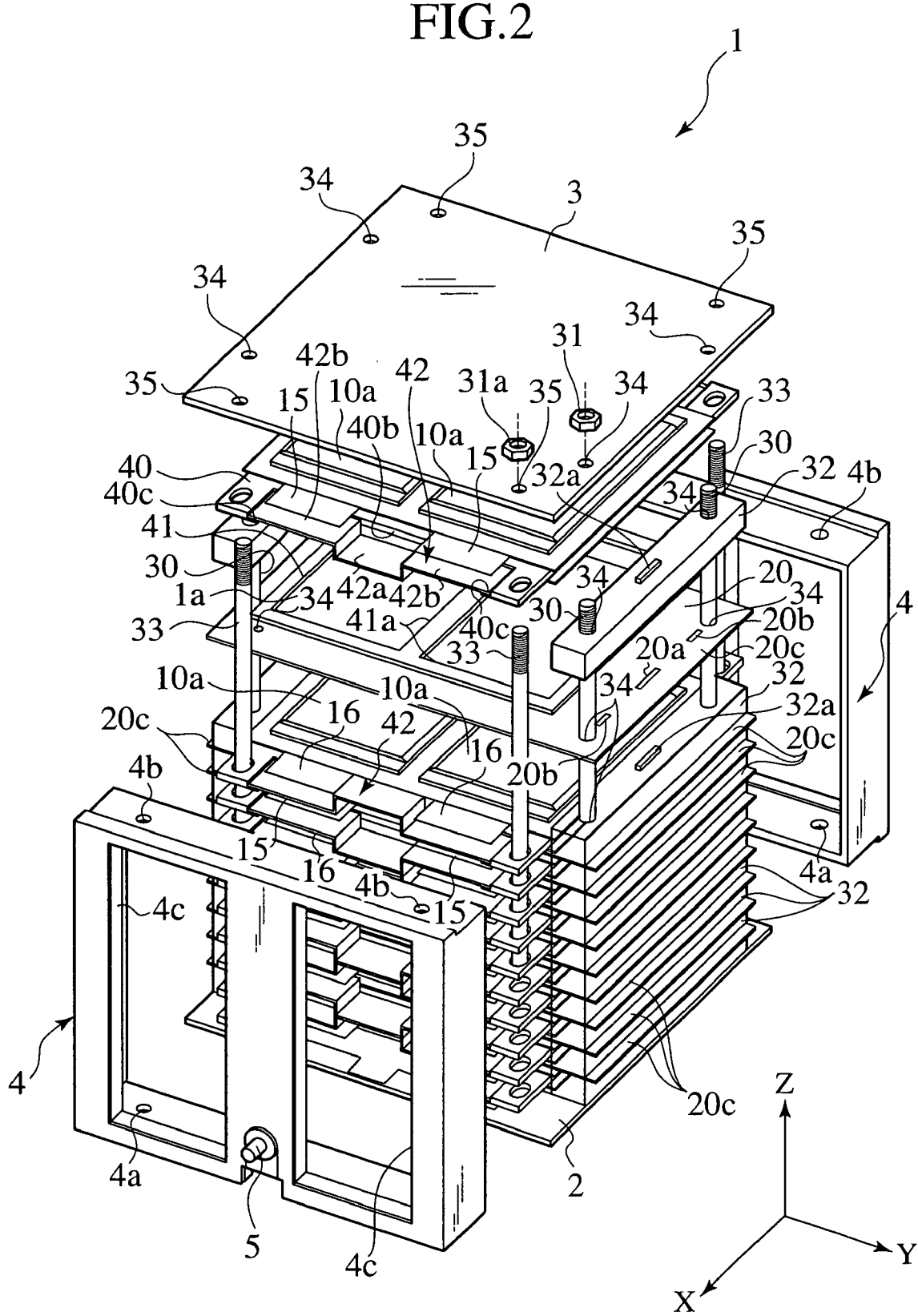
FIG. 2 is an exploded perspective view of the battery module in the embodiment of the present invention.

As illustrated in FIGS. 1 and 2, principal portions of the battery module 1 of this embodiment are configured by stacking the submodule packs 1a at plural stages (eleven stages in this embodiment). Moreover, the battery module 1 is configured in a manner that the stacked portions of the submodule packs 1a are installed between the base plate 2 and the upper plate 3 and sides thereof are covered with the pair of covers 4.

Figure 3:
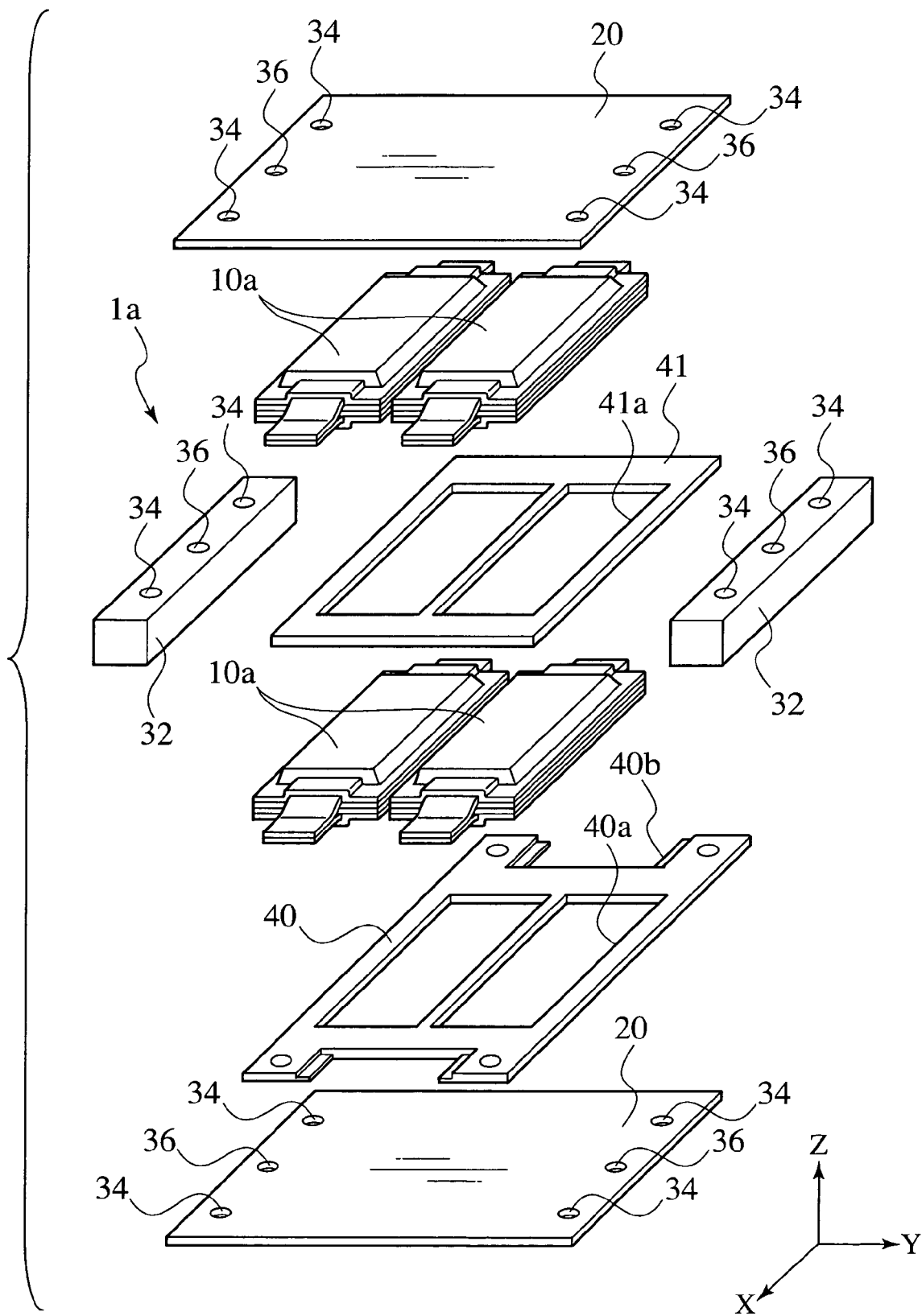
FIG. 3 is an exploded perspective view of a submodule pack in the embodiment of the present invention.
Figure 4:
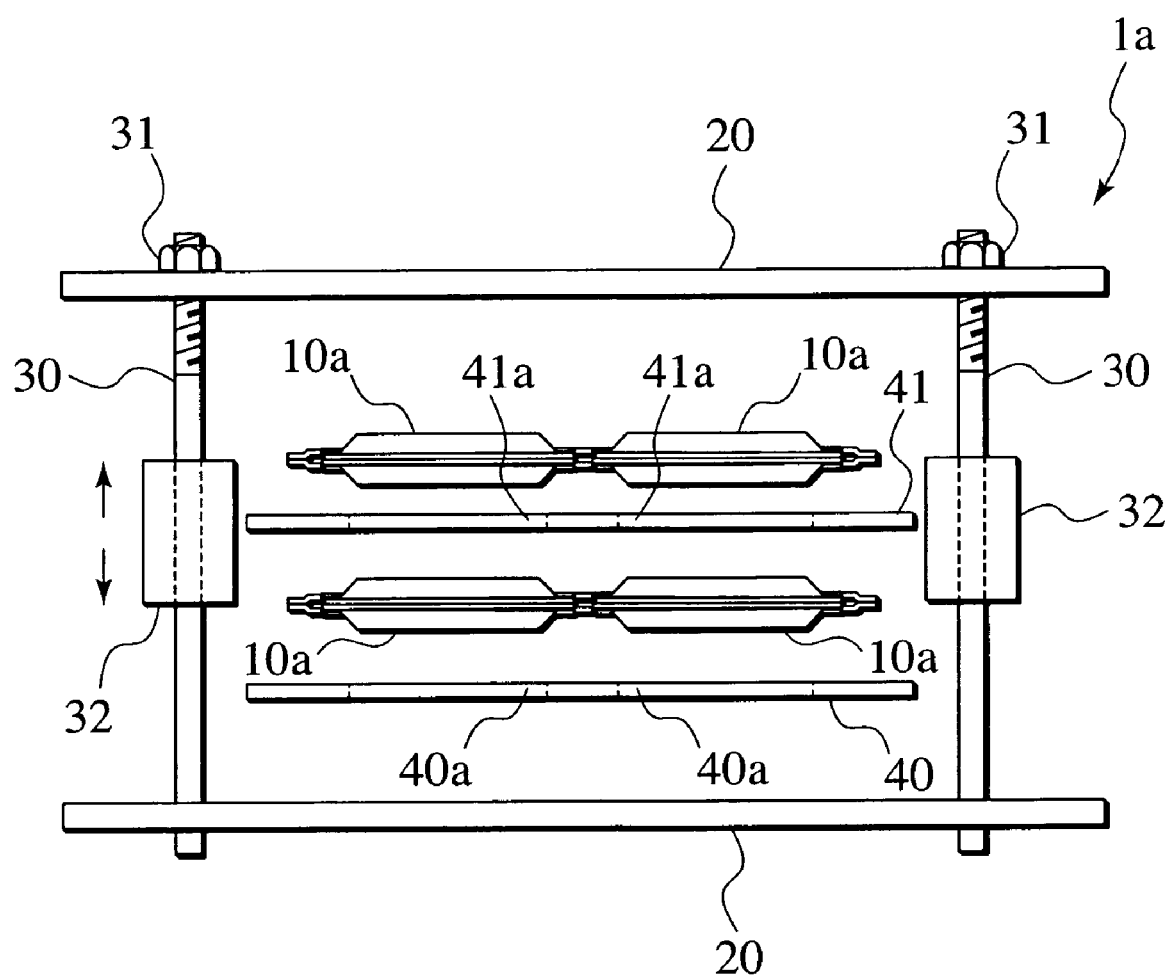
FIG. 4 is a front view schematically illustrating the submodule pack in the embodiment of the present invention.
Figure 5:
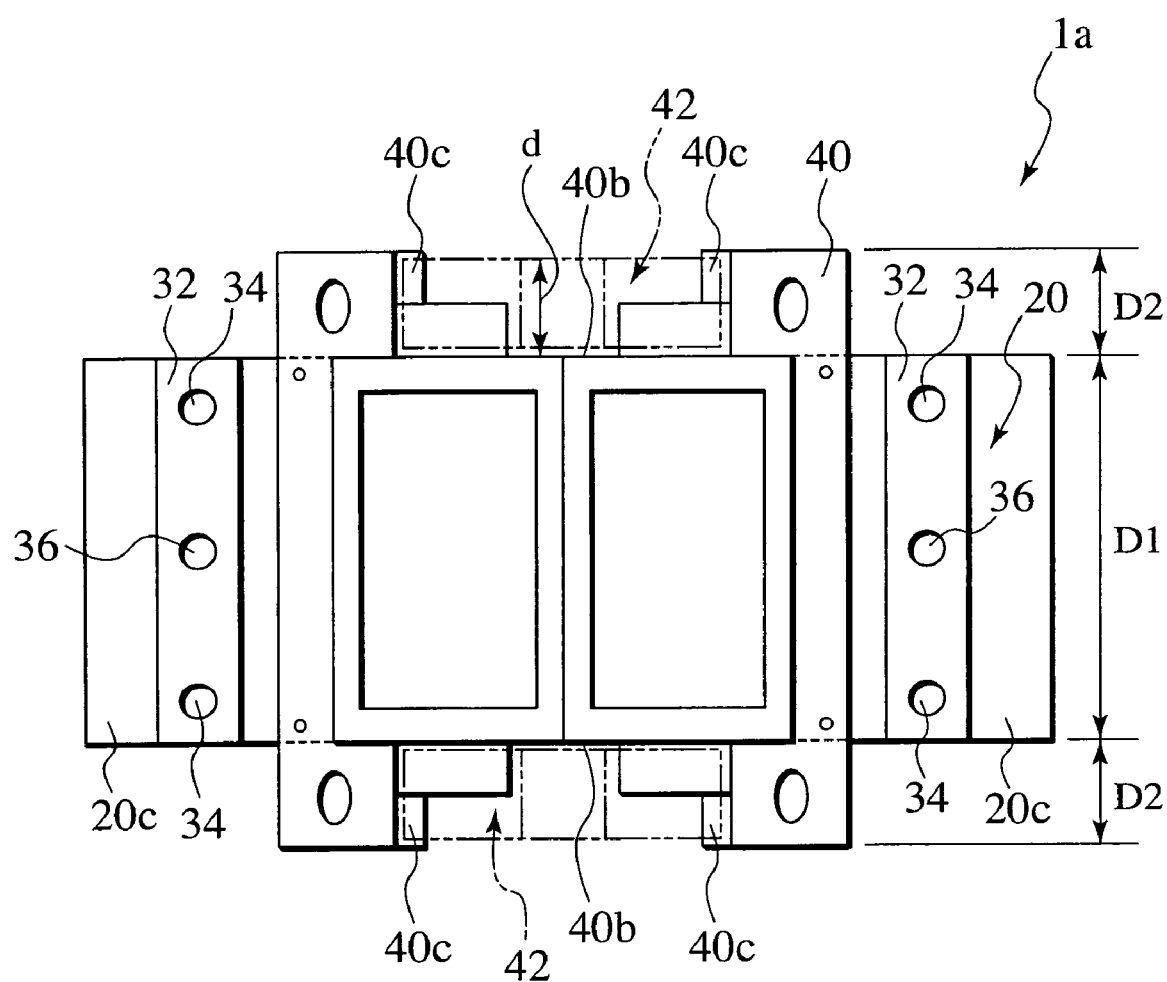
FIG. 5 is a plan view illustrating the submodule pack in the embodiment of the present invention with one of pressuring members taken off.

As illustrated in FIGS. 3 to 5, the submodule pack 1a is configured in a manner that two cell units 10a are arranged in parallel in the Y direction and the two cell units 10a thus arranged in parallel are stacked at two stages in the Z direction.

Figure 7:
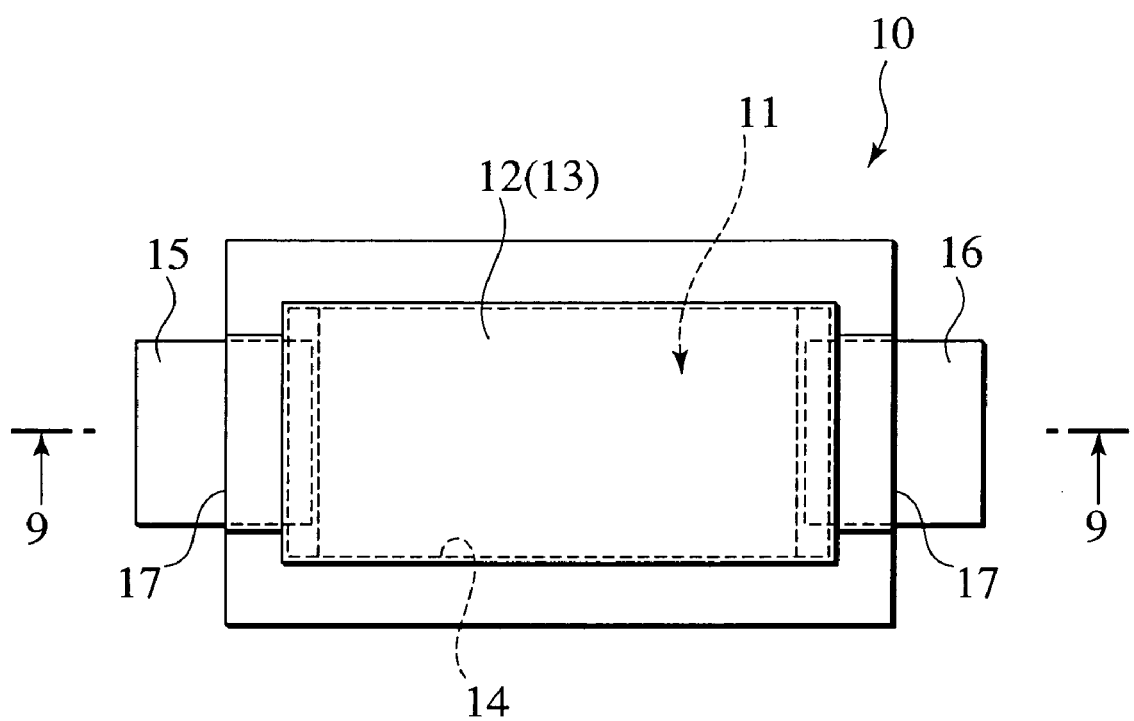
FIG. 7 is a plan view of the cell in the embodiment of the present invention.
Figure 8:
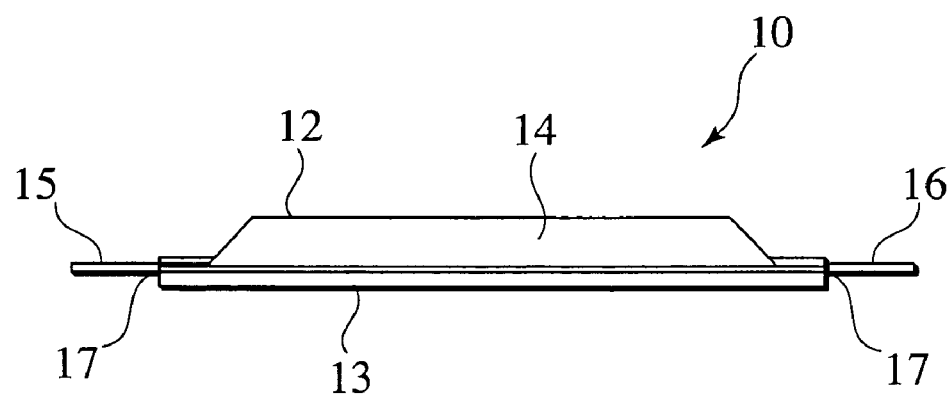
FIG. 8 is a front view of the cell in the embodiment of the present invention.
Figure 10:
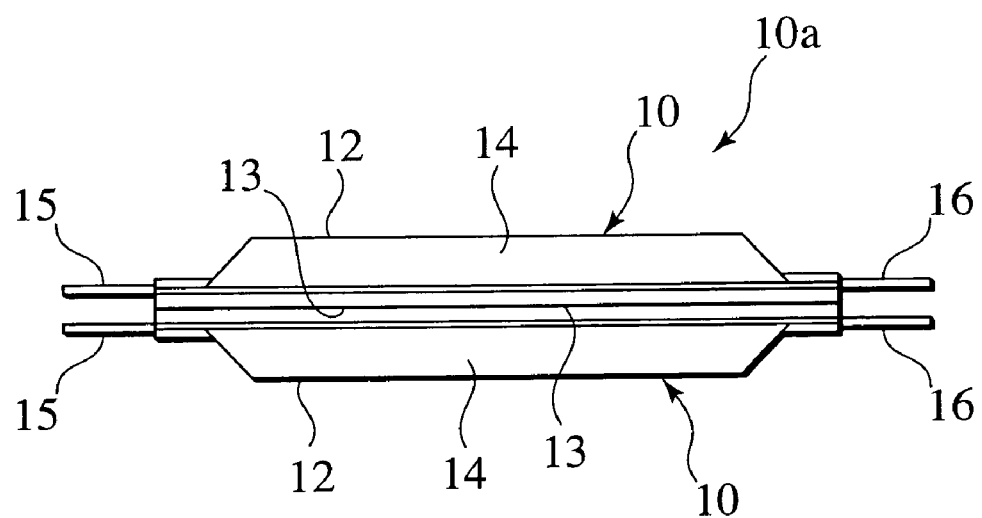
FIG. 10 is a front view of a cell unit in the embodiment of the present invention.

In this case, the cell unit 10a is configured in a manner that the cell 10 configured as a stacked cell is used as a fundamental unit as illustrated in FIGS. 7 and 8 and two cells 10 as illustrated in FIG. 10 are stacked to form a unit.

Figure 9:
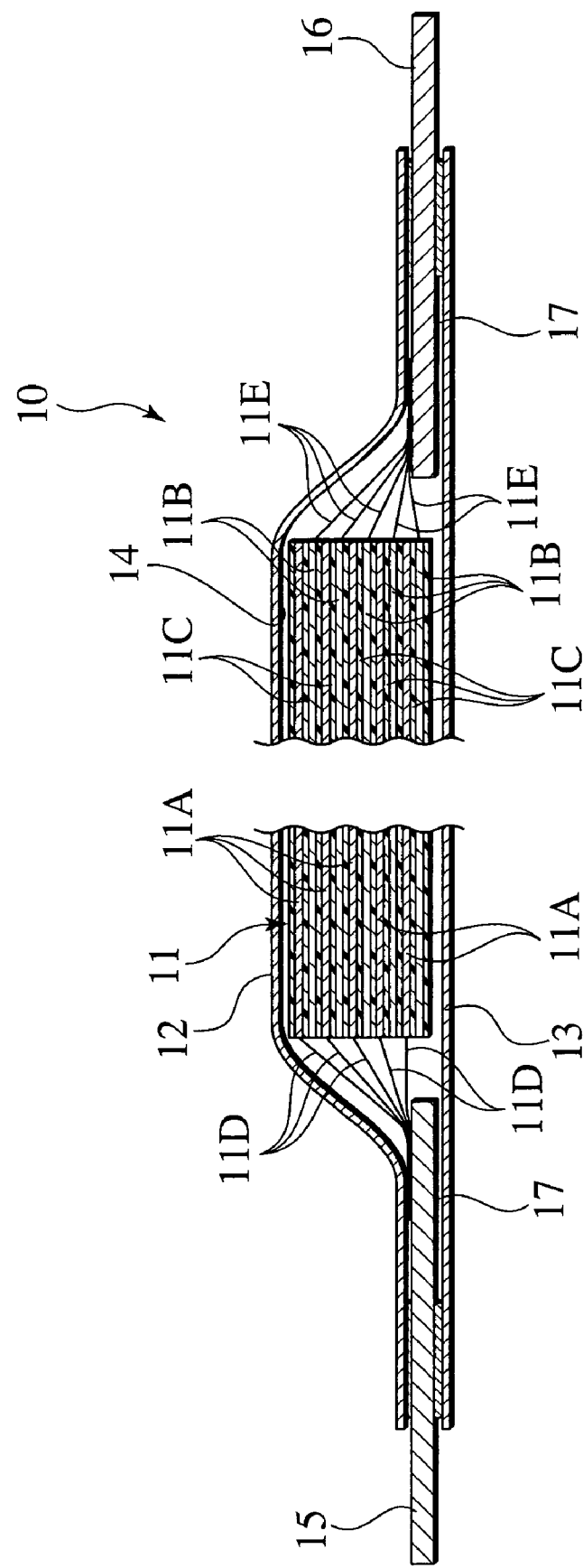
FIG. 9 is an enlarged cross-sectional view along a line 9—9 in FIG. 7.

As illustrated in FIG. 9, in the cell 10, the stacked electrode 11 serving as a power generation element is disposed between the first and second laminate sheets 12 and 13 which are made of metal composite films or the like serving as package materials. Both surfaces (in both right and left portions in FIG. 9) of the stacked electrode 11 are covered with these first and second laminate sheets 12 and 13 as to sandwich both surfaces.

In the first laminate sheet 12, the concave portion 14 serving as an outward-protruding portion is formed, and an electrolyte solution as well as the stacked electrode 11 are housed in the concave portion 14. Meanwhile, the second laminate sheet 13 formed flat so as to cover the opening portion of the concave portion 14 is disposed, and the peripheral portions of the first and second laminate sheets 12 and 13 are fused under a condition where an ambient pressure is reduced to hermetically seal the stacked electrode 11. Thus, the cell 10 of a lithium ion secondary battery is configured.

The stacked electrode 11 is configured by sequentially stacking the plurality of positive and negative electrode plates 11A and 11B with the separators 11C interposed therebetween. The positive electrode plates 11A are connected to the positive electrode tab 15, serving as one of electrode terminals, through the positive electrode leads 11D. The negative electrode plates 11B are connected to the negative electrode tab 16, serving as the other electro terminal, through the negative leads 11E. Then, these positive and negative electrode tabs 15 and 16 are drawn outward from the joint portions 17 formed by fusing the first and second laminate sheets 12 and 13.

As described above, in the cell 10, as also illustrated in FIG. 8, the concave portion 14 is protruded from the first laminate sheet 12, and the second laminate sheet 13 is formed entirely flat. In addition, the cell unit 10a is configured by joining the second flat laminate sheets 13 of the two cells 10 as illustrated in FIG. 10.

Herein, as illustrated in FIGS. 1 and 2, in the battery module 1 of this embodiment, the aluminum plates 20 serving as pressuring members are arranged between the submodule packs 1a such that each pair of the aluminum plates 20 sandwiches both surfaces of each submodule pack 1a in the stack direction. Moreover, pressing forces generated by the first locate pins 30 and the nuts 31 serving as the pressing means are applied between each pair of the aluminum plates 20. Thus, the cell units 10a are pressured in the stack direction. Furthermore, a state in which the cell units 10a are pressed by these first locate pins 30 and nuts 31 is managed by the spacers 32 serving as managing members.

As also illustrated in FIG. 3, each of the aluminum plates 20 is formed as a rectangular flat plate having an area sufficiently larger than an area occupied by the two cell units 10a arrayed in parallel in the Y direction in the drawings.

Note that the base plate 2 disposed under the submodule pack 1a at the lowermost stage among the submodule packs 1a stacked at the plural stages and the upper plate 3 disposed on the submodule pack 1a at the uppermost stage are provided with a function similar to that of the aluminum plates 20 which pressure the submodule packs 1a.

As illustrated in FIG. 2, two of the first locate pins 30 are erected for each of both side ends opposite to each other in the Y direction in the drawing. Specifically, four of the first locate pins 30 in total are erected. For each of both side ends opposite to each other in the X direction in the drawing, two of the second locate pins 33 are erected. Specifically, four of the second locate pins 33 in total are erected.

Meanwhile, as illustrated in FIGS. 2 and 3, each of the spacers 32 is formed as a block rectangular in cross section to be sufficiently endurable against a pressure applied in the vertical direction. For both ends of each spacer 32 and the four corners of each aluminum plate 20 and the upper plate 3, the first insertion holes 34 are respectively formed to insert the first locate pins 30.

Then, while alternately arranging each aluminum plate 20, each submodule pack 1a and each spacer 32, the first locate pins 33 are inserted from an upper portion thereof into the first insertion holes 34 of each aluminum plate 20 and each spacer 32 in this order, and finally, inserted into the first insertion holes 34 of the upper plate 3.

In addition, between the aluminum plates 20 forming a pair in the stack direction so as to sandwich the submodule pack 1a therebetween, there are provided the first and second support plates 40 and 41 as position regulating members which regulate the position of the cell unit 1a in directions (X and Y directions in the drawings) perpendicular to the direction (vertical direction in the drawing) where the cell unit 1a is pressured.

The first and second support plates 40 and 41 are formed of an insulating material, and in this embodiment, formed of PPS resin as a raw material. However, other resin materials besides the PPS may be used as a matter of course.

Moreover, as illustrated in FIG. 5, as an insulation measure given by the shape, the first and second support plates 40 and 41 are protruded outward by the width D2 instead of the width D1 of the aluminum plates 20 in the X direction in the drawing. Thus, connection portions of the electrode tabs 15 and 16 of the cells 10 and busbars 42 to be described later are separated from one another.

Either the first or second support plates 40 and 41 is disposed between the cell units 10a stacked vertically in the submodule pack 1a, and the other is disposed between the lower cell unit 10a and the aluminum plate 20.

Then, in the first and second support plates 40 and 41, the opening portions 40a and 41a serving as engaging portions along the outer shapes of the concave portions 14 (refer to FIGS. 8 and 10) of the cell units 10a arrayed in the Y direction in the drawings, which protrude downward, are formed. The concave portions 14 are engaged with these opening portions 40a and 41a, and thus the cell units 10a are positioned. In such a way, the cell units 10a are prevented from being misaligned to the X and Y directions in the drawings.

Note that any of the first and second support plates 40 and 41 may be arranged above. In FIG. 2, the case is shown where the first support plate 40 is arranged above the second support plate 41. On the contrary, in FIG. 3, the case is shown where the first support plate 40 is arranged below the second support plate 41. Both of the cases are shown in one embodiment for convenience.

On the four corners of the first support plate 40, the second insertion holes 35 are to receive the second locate pins 33. The second locate pins 33 are inserted into the insertion holes 35, and thus the first support plate 40 is positioned.

The tips (upper ends in the drawings) of the first and second locate pins 30 and 33 are tapped as male screws as illustrated in FIG. 4. The nuts 31 and the nuts 31a are screwed to the first and second locate pins 30 and 33, respectively, and are tightened, and thus the battery module is assembled.

In addition, an interval between the aluminum plates 20 arranged between the spacers 32 is slightly changed depending on the degree of tightening of the nuts 31 on the first locate pins. Thus, the force with which the aluminum plates 20 press the submodule packs 1 is minutely changed. Thus, the surface pressure of each cell 10 configuring the submodule pack 1a can be adjusted.

In this case, the height h (refer to FIG. 3) of each spacer 32 is made somewhat smaller than the thickness of the entire cell unit 10a in which the cell units 10a are stacked at the two stages in consideration of the pressing force applied to the submodule pack 1a. Moreover, each spacer 32 is formed in advance such that the height h is set precisely. Thus, precise management is made such that the interval between the aluminum plates 20 is maintained constantly so as to avoid applying more pressing force to the cells 10 when the tightening force of the nuts 31 reaches a predetermined value.

Figure 11:
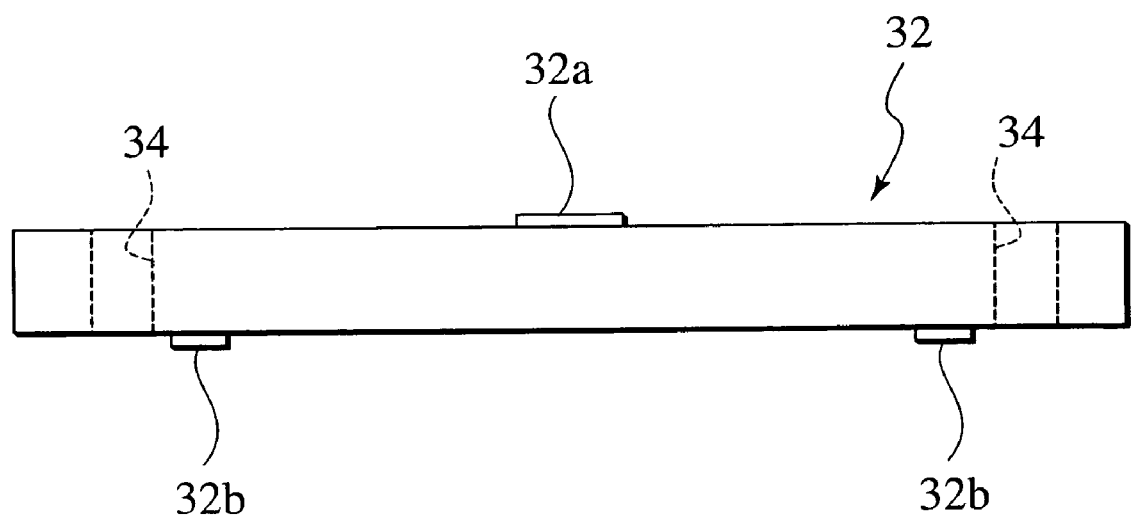
FIG. 11 is a front view of a managing member in the embodiment of the present invention.

In addition, as illustrated in FIG. 11, the convex portion 32a is protruded from the center of the upper surface of the spacer 32, and the convex portions 32b are protruded from both ends of the lower surface of the spacer 32. Meanwhile, as illustrated in FIG. 2, in the portions of the aluminum plate 20, to which the spacers 32 abut, the engaging holes 20a and 20b are formed at positions to respectively receive the convex portion 32a on the upper surface and the convex portions 32b on the lower surface. The convex portion 32a and the engaging hole 20a are engaged, and the concave portions 32b and the engaging holes 20b are engaged with each other. Thus, the spacer 32 and the aluminum plate 20 are positioned.

Note that, though the convex portions 32a and 32b and the engaging holes 20a and 20b can position the aluminum plate 20 and the spacer 32 with high precision, the convex portions 32a and 32b and the engaging holes 20a and 20b are not always necessary because the aluminum plate 20 and the spacer 32 are positioned also by the first locate pins 30.

Moreover, for convenience, instead of the convex portions 32a and 32b and the engaging holes 20a and 20b for positioning, the third insertion holes 36 may be formed on the centers of the aluminum plate 20 and the spacers 32, and an unillustrated locate pins may be inserted into the third insertion holes 36 as illustrated in FIG. 3.

Incidentally, as illustrated in FIG. 2, the covers 4 are installed simultaneously when the second locate pins 33 are inserted into the aluminum plates 20. The portions of the insertion holes 4a formed on the lower ends of the covers 4 are inserted between the lowermost aluminum plate 20 and the base plate 2. The portions of the insertion holes 4b formed on the upper ends of the covers 4 are inserted between the uppermost aluminum plate 20 and the upper plate 3.

Large heat radiation openings 4c are formed on both right and left sides of each of the covers 4. In addition, one of the positive and negative terminals 5 is protruded from the lower portion of the center of one cover 4 (on the very front in FIG. 2), and the other of the positive and negative terminals (not shown) is protruded from an equivalent position of the other cover 4 (on the other side in FIG. 2). To the respective terminals 5, the corresponding electrode tabs 15 and 16 of the respective cells 10 are intensively connected.

As illustrated in FIGS. 2 and 3, on both ends of the first support plate 40 in the X direction in the drawings, the busbars 42 serving as connecting members which electrically interconnect the electrode tabs 15 and 16 of the stacked cell units 10a are provided, and the rectangular notched portions 40b (refer to FIG. 5) serving as attachment portions which are positioned between the second insertion holes 35 and temporarily hold the busbars 42 are formed.

The step difference portions 40c are formed on both sides of the notched portions 40b in the Y direction in the drawings. On the step difference portions 40c, both ends of the busbars 42 are mounted.

The busbars 42 are formed into a strip shape of which width corresponds to the notched depth d (refer to FIG. 5) of the notched portions 40b. Both ends of each busbar 42 become the flat portions 42b as terminal contact portions capable of contacting the electrode terminals 15 and 16 of the cell unit 10a. The center of the busbar 42 becomes the convexedly bent portion 42a as an adjacent cell contact portion which contacts the busbar 42 adjacent thereto in the stack direction.

Hence, when sequentially stacking and installing the submodule packs 1a, the electrode tabs 15 and 16 protruding from both ends of the cell units 1a in the X direction in the drawings are positioned on both ends of the notched portions 40b of the first support plates 40 in the X direction. The electrode tabs 15 and 16 contact the flat portions 42b of the busbars 42 temporarily held on the notched portions 40b and are electrically connected thereto.

In this case, in each submodule pack 1a, in the cell units 10a arranged in parallel in the Y direction in the drawings, any of the positive and negative electrode tabs 15 and 16, of which polarity is the same, are arrayed in the Y direction in the drawings. Thus, the electrode tabs 15 and 16 of the respective cell units 10a are connected in parallel through each busbar 42.

Moreover, in the convexedly bend portions 42a of the busbars 42, the protruding directions thereof become alternately upward and downward in the stack direction. On both ends of the first support plates 40 in the X direction, the protruding directions of convexedly bent portions 42a are reversed.

Figure 12A:
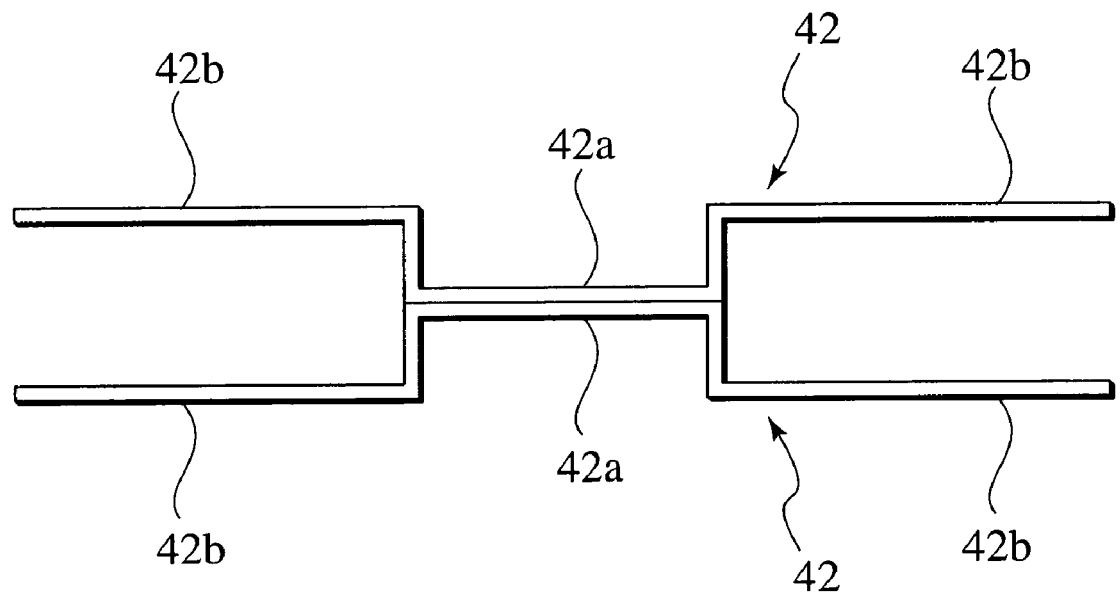
FIGS. 12A and 12B are front views illustrating connecting members in the embodiment of the present invention.
Figure 12B:
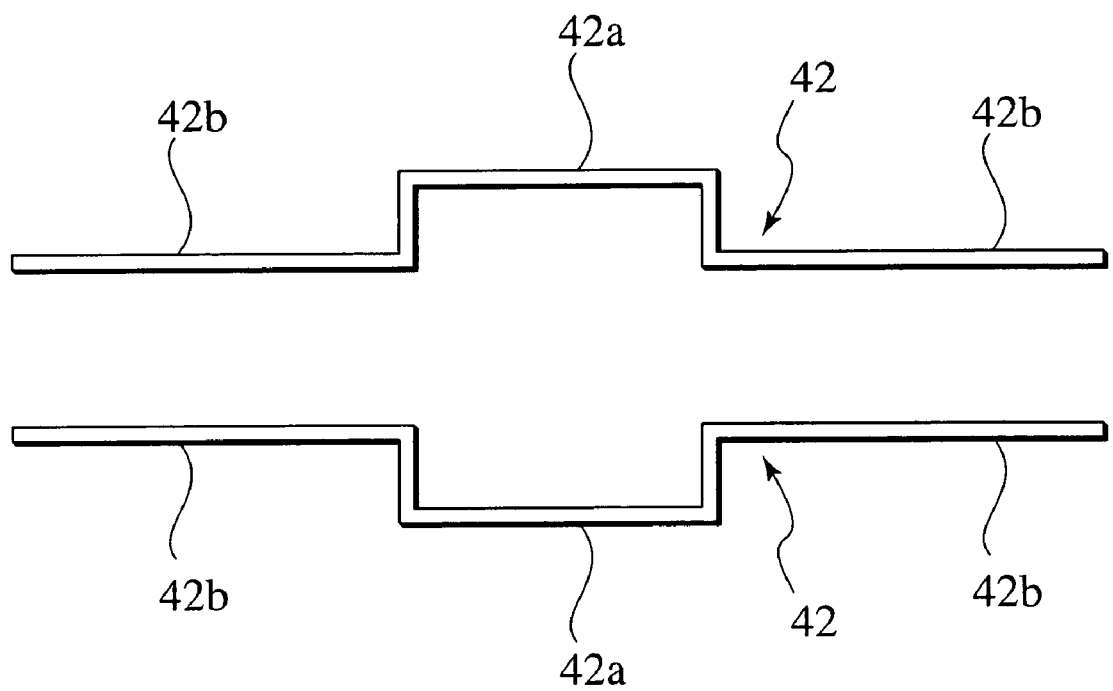

Hence, when sequentially stacking the submodule packs 1a, the convexedly bent portions 42a of the vertically adjacent busbars 42 contact and are electrically connected to each other on one side in the X direction as illustrated in FIG. 12A. Meanwhile, the convexedly bent portions 42 are protruded in the direction where they are separated from each other so as to avoid contacting another on the other side in the X direction as illustrated in FIG. 12B.

Hence, the busbars 42 arranged on both ends of the support plates 40 in the X direction contact alternately on the one sides and the other sides in the stack direction. Therefore, in the battery module 1, the cell units 10a stacked at the stages are connected in series in a state where the cell units 10a arrayed in the Y direction are connected in parallel.

Naturally, in this case, the positive and negative polarities of the electrode tabs 15 and 16 of the cell units 10a are reversely disposed between the submodule packs 1a adjacent to each other in the stack direction.

Note that, with regard to the connection mode of the cell units 10a, a combination of the serial connection and the parallel connection can be arbitrarily changed by appropriately changing the arrangement of the positive and negative electrode tabs 15 and 16 and the shape of the busbars 42. Thus, desired current value and battery capacity can be obtained.

In the aluminum plates 20 arranged between the submodule packs 1a, both ends in the Y direction in the drawings protrude farther than the spacers 32, and these protruding portions 20c are exposed to the outside air, thus functioning as heatsinks having a cooling function.

Incidentally, in an attempt of lightening the battery module 1 in weight and thinning the same and of improving cooling efficiency, the aluminum plates 20 are made of 6000-series aluminum which is light and rich in thermal conductivity. The use of this 6000-series aluminum enables the thickness of each aluminum plate 20 to be thinned approximately to 1 mm.

With the configuration described above, in the battery module 1 in this embodiment, two stacked cells 10 of stacked type batteries are joined to configure one cell unit 10a. Then, two cell units 10a are arrayed, and the arrayed cell units 10a are stacked at two stages, thus configuring the submodule pack 1a. The plurality of submodule packs 1a stacked at the stages configure the principal structure of the battery module 1. Then, in the battery module 1, the pressing force generated by the tightening force of the nuts 31 screwed to the first locate pins 30 is applied to the aluminum plates 20 arranged between the submodule packs 1a, thus pressuring both surfaces of the cell units 10a in the stack direction.

Accordingly, as illustrated in FIG. 9, in each cell 10 configuring the cell units 10a, the stacked cell 11 housed in the concave portion 14 of the first laminate sheet 12 is pressed in the compression direction, thus making it possible to reduce or eliminate the gaps between the positive electrode plates 11A, the negative electrode plates 11B and the separators 11C.

Moreover, the force applied to the stacked electrodes 11 can be precisely controlled by the tightening force of the nuts 31 while maintaining the interval between the aluminum plates 20 by the spacers 32 arranged therebetween.

Specifically, in the battery module 1 of this embodiment, in order to precisely control the force applied to the stacked electrodes 11, the spacers 32 and the stacked electrodes 11 are installed while investigating the heights h of all the spacers 32 and the thicknesses of all the stacked electrodes 11.

Figure 6:
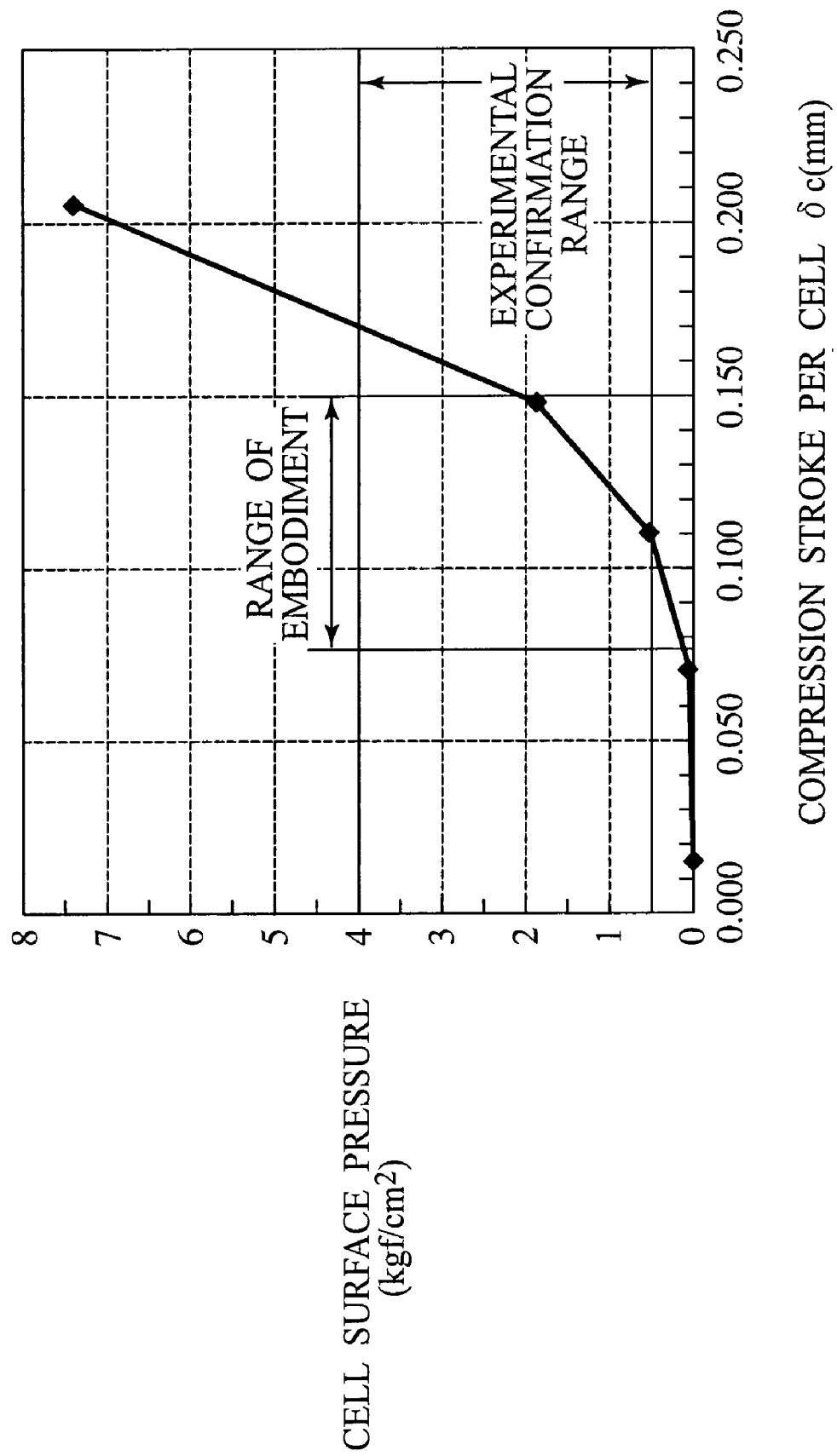
FIG. 6 is a graph showing a relationship between surface pressures and compression strokes of a cell serving as a fundamental unit of the battery module in the embodiment of the present invention.

FIG. 6 is a graph showing a relationship between the surface pressure (Kgf/cm$^2$) applied to each cell 10 and the compression strokes (mm) when the thickness of one stacked electrode 11 is set at 3.86±0.07 mm and the height h of one spacer 32 is set at 7.5±0.05 mm. When the concave portion 14 of the cell 10 is pressed with a surface pressure in a certain range, the distances between the electrodes of the stacked electrode 11 are fixed, and longevity is improved. When confirming an allowable surface pressure range in this case by the experimental confirmation range of FIG. 6, the range is from 0.5 to 4.0 Kgf/cm$^2$.

With regard to the thickness of the cell 10, the dimension tolerance of the height of the stacked electrode 11, which is controlled by the spacers 32, is set such that the surface pressure is set in the range where the extension of the longevity is ensured, by a combination of (1) two stacked electrodes 11 of which thickness is at the minimum tolerance and one spacer 32 of which height h is at the maximum tolerance and (2) two stacked electrodes 11 of which thickness is at the maximum tolerance and one spacer 32 of which height h is at the minimum tolerance. In this case, the surface pressure ranges from 0.07 to 0.42 Kgf/cm$^2$ in this embodiment.

Hence, in the battery module 1 of this embodiment, degradation of the battery performance can be prevented, and stable battery performance can be exhibited. Particularly, even when the battery module 1 is mounted under severe conditions where vibrations of vehicles and temperature changes are intense, initial battery performance can be maintained for a long period of time, and thus a reliable battery module 1 can be provided.

Moreover, in the battery module 1 of this embodiment, the first and second support plates 40 and 41, which regulate the positions of the cell units 10a in the directions (X and Y directions in the drawings) perpendicular to the direction (Z direction in the drawings) where the cell units 10a are pressured, are provided between the pair of aluminum plates 20. Therefore, the cell units 10a can be also prevented from being easily moved by the vibrations and impacts applied thereto. Accordingly, the force applied through the aluminum plates 20 can be applied equally to the respective cells 10 to equalize the surface pressures thereof, thus making it possible to stably enhance the battery performance of the entire battery module 1. In addition, the misalignment of the connection/welding points between the electrode tabs 15 and 16 drawn from the cells 10 and the busbars 42 can be controlled to the minimum, thus making it possible to achieve the improvement of the ease of assembly, and eventually, the enhancement of the productivity.

Furthermore, the notched portions 40b, which temporarily hold the busbars 42 electrically interconnecting the electrode tabs 15 and 16 of the stacked cell units 10a, are formed in the first support plate 40. Therefore, by simply setting the busbars 42 on the step difference portions 40c of the notched portions 40b, the respective cell units 10a are enabled to be interconnected without requiring complicated wiring, thus making it possible to simplify the installation of the battery module 1.

Still further, each of the busbars 42 is configured such that the flat portions 42b, which contact the electrode tabs 15 and 16 of the cell units 10a, and the convexedly bent portion 42a, which continues from these flat portions 42b and contacts the busbar 42 adjacent thereto in the stack direction, are provided. Therefore, the busbar 42 can be manufactured at low costs by adopting a simple structure in which the convexedly bent portion 42a is formed simply by bending a strip shaped plate.

Moreover, in each of the aluminum plates 20, both ends thereof in the Y direction in the drawings are protruded farther than the spacers 32, and the cooling function is provided therewith. Thus, each aluminum plate 20 can be used as a heatsink. The heat generated in the battery module 1 can be effectively radiated outward, and the battery module 1 can be cooled. Hence, overheat can be prevented, and the stable battery performance can be maintained.

Furthermore, in the first and second support plates 40 and 41, the opening portions 40a and 41a along the outer shapes of the concave portions 14 protruding downward of the cell units 10a are formed. The concave portions 14 are engaged with these opening portions 40a and 41a, and thus the cell units 10 are positioned. Therefore, even if the first laminate sheets 12 of the cells 10, which have the concave portions 14 formed thereon, are made of a flexible material, the cell units 10a can be positioned by the outer circumferences of the concave portions 14 in which rigidity is increased by such protrusion. Hence, the cell units 10a can be certainly inhibited from moving while effectively utilizing the existing shapes that are the concave portions 14.

Incidentally, in the described embodiment, the battery module 1 is configured by stacking the submodule packs 1a at eleven stages in the Z direction, and the submodule packs 1a are configured by stacking the cell units 10a in one row in the X direction, in two columns in the Y direction and at two stages in the Z direction. However, the present invention is not limited to this. The number of stages at which the submodule packs 1a are stacked and the configuration of the submodule packs 1a can be arbitrarily set suitably for target electric power/capacity values.

Figure 13:
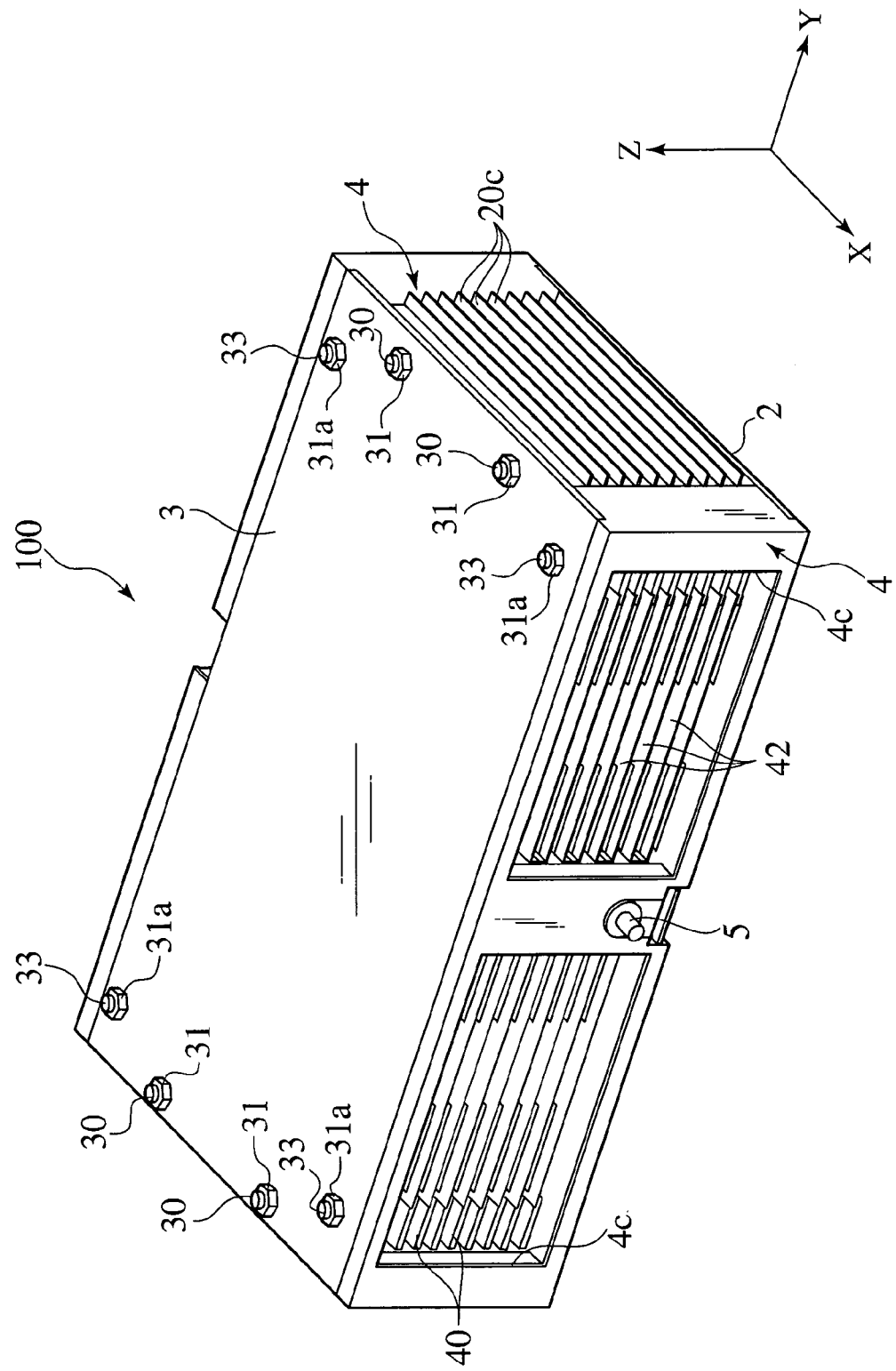
FIG. 13 is a perspective view illustrating an entire battery module in the other embodiment of the present invention.
Figure 14:
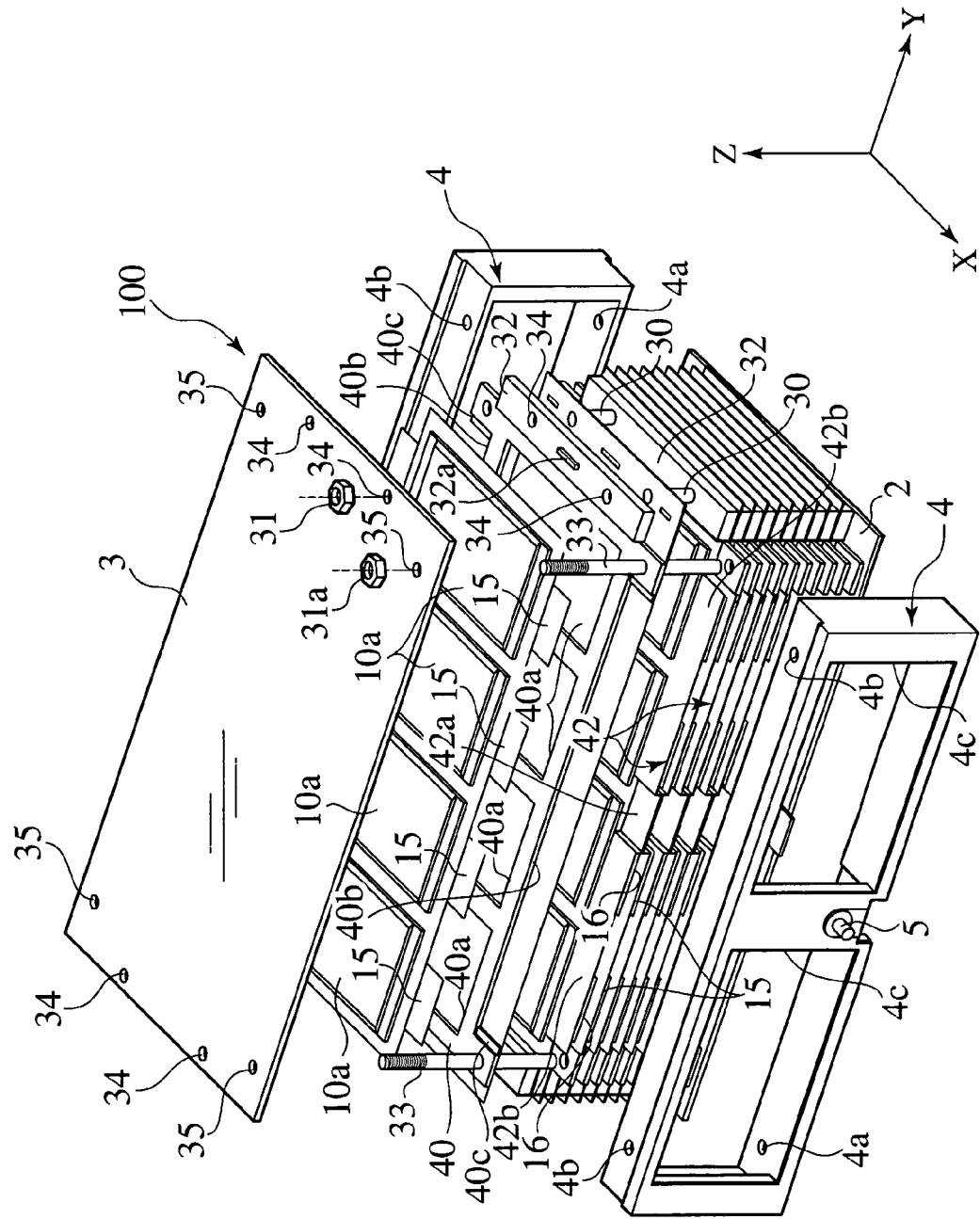
FIG. 14 is an exploded perspective view of the battery module in the other embodiment of the present invention.

For example, FIGS. 13 and 14 illustrate the battery module 100 of another embodiment. The submodule pack 1a of this battery module 100 is configured by stacking the cell units 10a in one row in the X direction, in four columns in the Y direction and at one stage in the Z direction.

Note that FIG. 13 is a perspective view of the entire battery module, which corresponds to FIG. 1, and that FIG. 14 is an exploded perspective view of the battery module, which corresponds to FIG. 2. Also in this embodiment, in a similar way to that in the aforementioned embodiment, each of the cell units 10a is configured in a manner that the flat second laminate sheets 13 of two cells 10 are joined and the two cells 10 are made into a unit (refer to FIG. 10).

Other aspects of the configuration of the battery module are approximately the same as those in the aforementioned embodiment though the entire sizes differ. The same reference numerals are used for the corresponding constituent portions as those in the aforementioned embodiment. Naturally, this embodiment also exerts the same operation and effect as those in the aforementioned embodiment.

Figure 15:
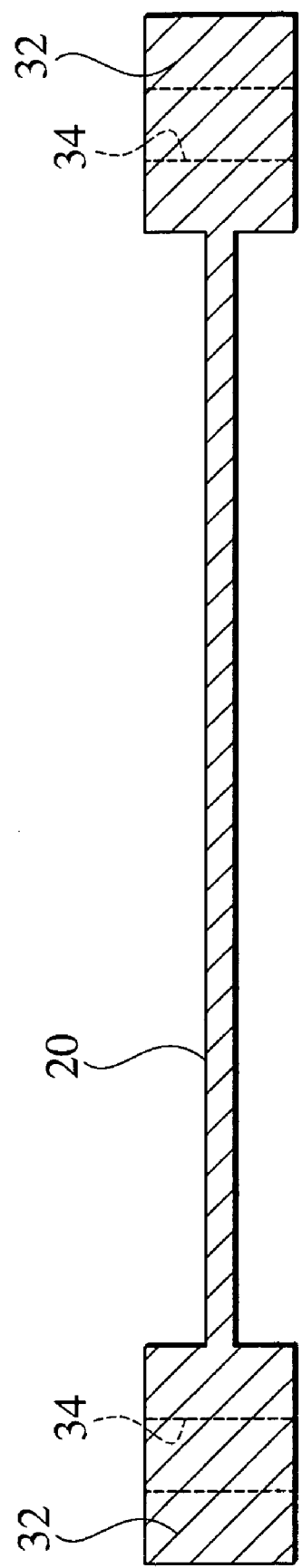
FIG. 15 is a cross-sectional view illustrating a modification example of the pressuring member and the managing member for use in the present invention.

Although the battery module of the present invention has been described by means of the above-described embodiments taken as examples, the battery module of the present invention is not limited to these embodiments, and other various embodiments can be adopted without departing from the gist of the present invention. For example, though the aluminum plate 20 and the spacer 32 are provided as separate bodies, both of them can be monolithically formed as illustrated in FIG. 15. In addition, though the pressuring members are formed of the aluminum plates 20 for the purpose of lightweighting, other members with large rigidity can be used. In addition, members with large thermal conductivity may be selected for a heatsink.

Moreover, though each of the cell units 10a is configured by joining two cells 10, the cell unit 10a may be formed of a single cell 10 as matter of course. Furthermore, the cell unit 10a can be configured by combining three or more cells 10.

Furthermore, the single cell is not limited to the lithium ion secondary battery, and the present invention can be applied even in the case of using other batteries configured similarly.

With the configuration described above, in the present invention, the pressing force by the pressing means is applied to the pressuring members, and both surfaces of the cell units in the stack direction are pressured. Therefore, the power generation elements of the stacked cells, which configure the cell units, can maintain a state where the electrode plates are pressed, and the pressed state of the power generation elements can be precisely managed by the managing members. Accordingly, the deterioration of the battery performance is prevented, and the stable battery performance can be exhibited.

Japanese Patent Application No. 2002-222116, filed on Jul. 30, 2002, is incorporated herein by reference in its entirety.

What is claimed is:

1. A battery module, comprising:
   a plurality of stacked cells being stacked, in each of which an electrolyte solution and a power generation element formed by stacking electrode plates are hermetically sealed by a package formed by a sheet, and electrode terminals connected individually to the electrode plates of the power generation element are drawn outward from the package formed by a sheet;
   a pair of pressuring members arranged in a stack direction where the stacked cells are stacked;
   a pressing mechanism for applying a pressing force between the pair of pressuring members to pressure the stacked cells in the stack direction; and
   a managing member which manages a state of pressing the stacked cells by the pressing mechanism.

2. The battery module according to claim 1, wherein a position regulating member which regulates a position of the stacked cells in a direction perpendicular to a direction where the stacked cells are pressured is provided between the pair of pressuring members.

3. The battery module according to claim 2, wherein the position regulating member comprises attachment portions which temporarily hold connecting members electrically interconnecting the electrode terminals of the stacked cells being stacked.

4. The battery module according to claim 3, wherein the connecting members comprise:
   terminal contact portions which contact the electrode terminals of the stacked cells; and
   adjacent cell contacting portions which extend from the terminal contact portions and contact the connecting members adjacent thereto in the stack direction.

5. The battery module according to claim 1, wherein the pressuring members at least partially protrude outward from stack portions of the stacked cells, and the protruding portions have a cooling function.

6. The battery module according to claim 2, wherein position regulating members comprise engaging portions which engage with outward-protruding portions of the package formed by a sheet housing the power generation element of each of the stacked cells therein and position a cell unit.

7. The battery module according to claim 1, further comprising:
   a position regulating member that regulates a position of the stacked cells in a direction perpendicular to a direction in which the stacked cells are pressured;
   wherein the position regulating member is stacked between cells and pressuring members in the stack direction.

8. The battery module according to claim 7, wherein the position regulating member regulates a position of the stacked cells in two directions that are perpendicular to a direction where the stacked cells are pressured.

9. The battery module according to claim 7, further comprising end plates, wherein the stacked cells, pressuring members, position regulating member, and managing member are stacked between the end plates.

10. The battery module according to claim 1, further comprising:
    a position regulating member that regulates a position of the stacked cells in a direction perpendicular to a direction in which the stacked cells are pressured;
    wherein the position regulating member includes an opening portion for engaging with a portion of a cell.

11. The battery module according to claim 1, wherein the managing member includes protrusions on surfaces of the managing member that engage with the pressuring members;
    wherein the pressuring members include holes that engage with the protrusions of the managing member.

12. The battery module according to claim 1, wherein the package formed by a sheet comprises a first sheet and a second sheet, wherein peripheral portions of the first sheet and second sheet are fused to form the hermetic seal;

wherein the first sheet includes a concave portion;
  wherein the stack of electrode plates is positioned within the concave portion;
wherein the second sheet covers an opening formed by the concave portion of the first sheet.

13. A battery module, comprising:
  a plurality of stacked cells being stacked, in each of which an electrolyte solution and a power generation element formed by stacking electrode plates are hermetically sealed by a package formed by a sheet, and electrode terminals connected individually to the electrode plates of the power generation element are drawn outward from the package formed by a sheet;
  a pair of pressuring members arranged in a stack direction where the stacked cells are stacked;
  pressing means for applying a pressing force between the pair of pressuring members to pressure the stacked cells in the stack direction; and
  managing means for managing a state of pressing the stacked cells by the pressing means.

14. A method for manufacturing a battery module, comprising:
  stacking a plurality of cells, in each of which an electrolyte solution and a power generation element formed by stacking electrode plates are hermetically sealed by a package formed by a sheet, and electrode terminals connected individually to the electrode plates of the power generation element are drawn outward from the package formed by a sheet;
  arranging a pair of pressuring members in a stack direction where the stacked cells are stacked;
  applying a pressing force between the pair of pressuring members with a pressing mechanism to pressure the stacked cells in the stack direction; and
  managing a state of pressing the stacked cells by the pressing mechanism with a managing member.

* * * * *